United States Patent
Asai

(10) Patent No.: US 9,235,368 B2
(45) Date of Patent: Jan. 12, 2016

(54) INFORMATION PROCESSING DEVICE, INFORMATION PROCESSING METHOD, AND COMPUTER-READABLE MEDIUM BEARING PROGRAM FOR CONTROLLING INFORMATION PROCESSING DEVICE

(75) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 743 days.

(21) Appl. No.: 13/247,950

(22) Filed: Sep. 28, 2011

(65) Prior Publication Data
US 2012/0081745 A1 Apr. 5, 2012

(30) Foreign Application Priority Data
Sep. 30, 2010 (JP) ................................. 2010-221848

(51) Int. Cl.
*G06F 3/12* (2006.01)

(52) U.S. Cl.
CPC ............ *G06F 3/1292* (2013.01); *G06F 3/1204* (2013.01); *G06F 3/126* (2013.01); *G06F 3/1273* (2013.01); *G06F 3/1285* (2013.01)

(58) Field of Classification Search
CPC ..... G06F 3/1259; G06F 3/1226; G06F 3/126; G06F 3/1253; G06F 3/1288; G06F 3/1292; G06F 3/1204; G06F 3/1273; G06F 3/1285
USPC ....................................... 358/1.16, 1.13–1.15
See application file for complete search history.

(56) References Cited

U.S. PATENT DOCUMENTS

| | | | | |
|---|---|---|---|---|
| 6,348,971 B2* | 2/2002 | Owa et al. | | 358/1.15 |
| 6,369,909 B1* | 4/2002 | Shima | | 358/1.15 |
| 2009/0168100 A1* | 7/2009 | Huster | | 358/1.15 |
| 2009/0300659 A1* | 12/2009 | Asai | | 719/321 |

FOREIGN PATENT DOCUMENTS

| | | |
|---|---|---|
| JP | H11-053142 A | 2/1999 |
| JP | 2000-200164 A | 7/2000 |
| JP | 2003-022172 A | 1/2003 |

(Continued)

OTHER PUBLICATIONS

Japan Patent Office, Notice of Reasons for Rejection for Japanese Patent Application No. 2010-221848 (counterpart Japanese patent application), mailed Jul. 17, 2012.

(Continued)

*Primary Examiner* — Marivelisse Santiago Cordero
*Assistant Examiner* — Kent Yip
(74) *Attorney, Agent, or Firm* — Baker Botts L.L.P.

(57) ABSTRACT

An information processing device includes a communication unit, a memory and a controller. The controller is configured to store information in a first region of the memory as a first default device corresponding to a first job mode and to store information in a second region of the memory as a second default device corresponding to a second job mode. The controller is configured to read out the first default device from the first region of the memory when receiving a first job mode processing, and transmit command data to the read out first default device. The controller is further configured to read out the second default device from the second region of the memory when receiving a second job mode processing, and transmit command data to the read out second default device.

27 Claims, 10 Drawing Sheets

| JOB MODE | IP ADDRESS | MODEL NUMBER | REFERENCED OTHER JOB MODE DEFAULT PRINTER |
|---|---|---|---|
| PHOTOGRAPH | 211.9.36.148 | Ink-MFP331 | WEB PRINTING DEFAULT PRINTER |
| WEB | 211.9.36.150 | Ink-MFP431 | |
| DOCUMENT | 211.9.36.148 | Ink-MFP331 | WEB PRINTING DEFAULT PRINTER |

(56) References Cited

FOREIGN PATENT DOCUMENTS

| | | |
|---|---|---|
| JP | 2005-085132 A | 3/2005 |
| JP | 2006-111799 A | 4/2006 |
| JP | 2009-003586 A | 1/2009 |

OTHER PUBLICATIONS

Japan Patent Office, Decision to Grant a Patent for Japanese Patent Application No. 2010-221848 (counterpart Japanese patent application), mailed Oct. 9, 2012.

* cited by examiner

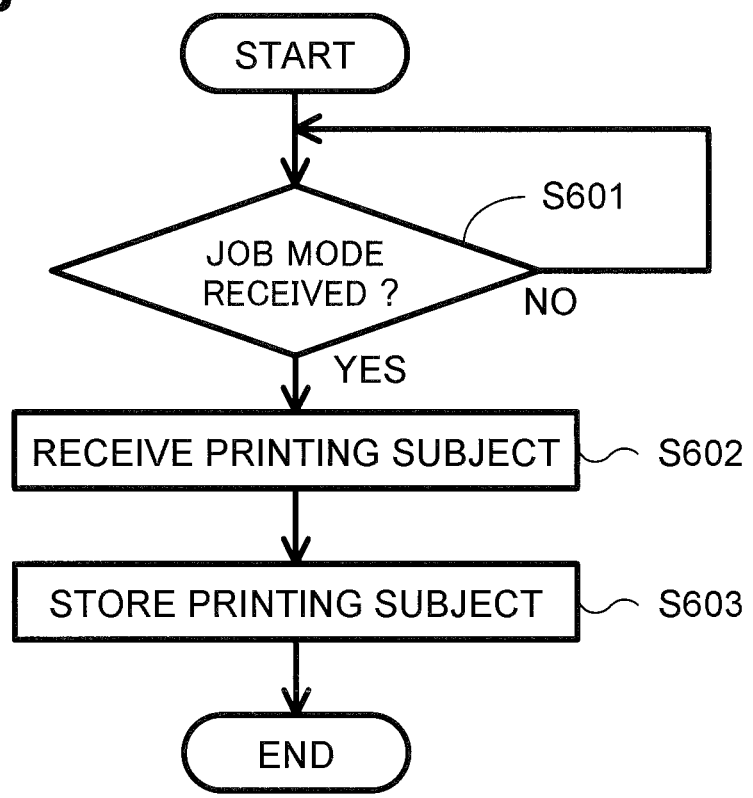

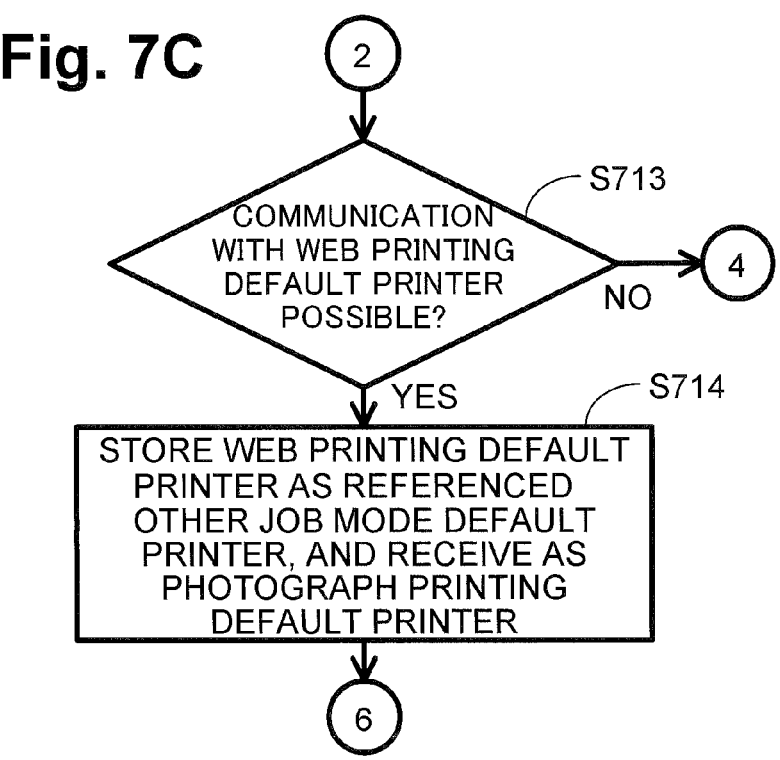
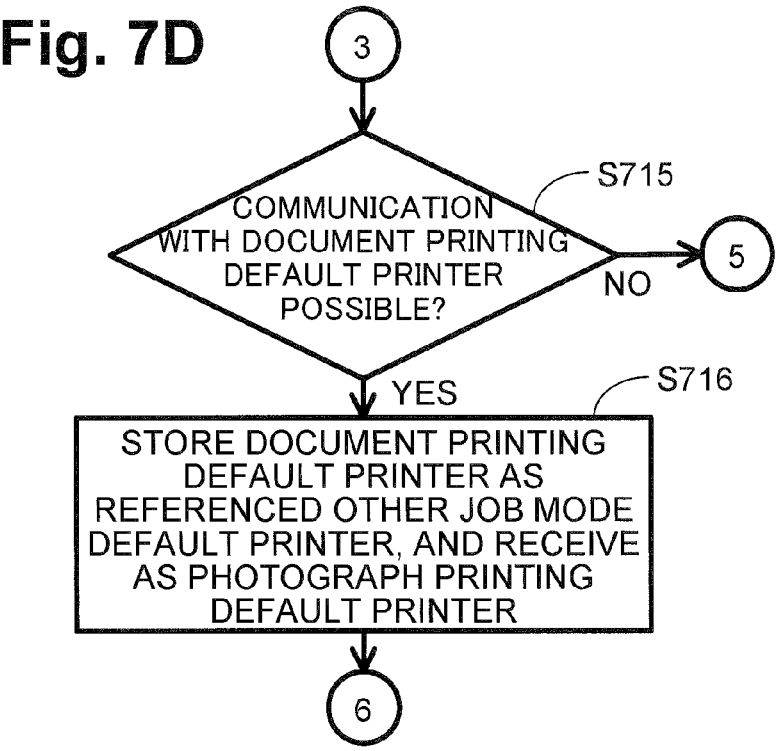

| MODEL NUMBER | PRINTING FUNCTION | IP ADDRESS |
|---|---|---|
| Ink-MFP331 | INKJET COLOR | 211.9.36.148 |
| Laser123 | LASER COLOR | 211.9.36.144 |
| Ink-MFP431 | INKJET COLOR | 211.9.36.150 |

Fig. 11

| JOB MODE | IP ADDRESS | MODEL NUMBER | REFERENCED OTHER JOB MODE DEFAULT PRINTER |
|---|---|---|---|
| PHOTOGRAPH | 211.9.36.148 | Ink-MFP331 | WEB PRINTING DEFAULT PRINTER |
| WEB | 211.9.36.150 | Ink-MFP431 | |
| DOCUMENT | 211.9.36.148 | Ink-MFP331 | WEB PRINTING DEFAULT PRINTER |

Fig. 12

| JOB MODE | IP ADDRESS | MODEL NUMBER | REFERENCED OTHER JOB MODE DEFAULT PRINTER |
|---|---|---|---|
| PHOTOGRAPH | 211.9.36.150 | Ink-MFP431 | WEB PRINTING DEFAULT PRINTER |
| WEB | 211.9.36.150 | Ink-MFP431 | |
| DOCUMENT | 211.9.36.148 | Ink-MFP331 | WEB PRINTING DEFAULT PRINTER |

INFORMATION PROCESSING DEVICE, INFORMATION PROCESSING METHOD, AND COMPUTER-READABLE MEDIUM BEARING PROGRAM FOR CONTROLLING INFORMATION PROCESSING DEVICE

CROSS REFERENCE TO RELATED APPLICATION

The present application claims priority from Japanese Patent Application No. 2010-221848, filed on Sep. 30, 2010, the disclosure of which is incorporated herein by reference in its entirety.

BACKGROUND

1. Technical Field

The present invention relates to an information processing device with which a default device setting is possible.

2. Related Art

To date, in a field of a computer such as a personal computer, a printing environment, in which a printer requested by a user is selected from plural printers connected to a network environment and a printing instruction is transmitted, has become generally popular. The user, in order to print with the requested printer, installs a driver corresponding to the type of the printer. When installing the driver, an IP address of the printer to be used via the driver is stored in the personal computer. When the IP addresses of one or more printers are stored in the personal computer, the IP address of one printer from among the IP addresses is registered as the IP address of a printer to be preferentially used. A printer preferentially used in this way is called a default printer. The personal computer, when receiving a request to print a document without receiving from the user a specification of a printer to which a printing instruction is to be transmitted, transmits the printing instruction to the printer registered as the default printer.

There is known an information processing device, which is connected to a network environment to which plural printers are connected, temporarily uses another printer as the default printer when the printer registered as the default printer is in a power saving mode. With this information processing device, when a job mode that cannot be executed by the default printer is requested, it is necessary for the user to select a printer that can execute the requested job mode.

SUMMARY

A need has arisen to provide an information processing device, information processing method, and a computer-readable medium bearing a program for controlling an information processing device, that can reduce inconvenience caused to a user, and set a corresponding device that can execute a process for requested one of the job modes.

According to an embodiment of the present invention, an information processing device communicable with a plurality of devices comprises a communication unit and an input receiving unit. The communication unit is configured to communicate with the plurality of devices. The input receiving unit is configured to receive an input inputted by a user, and is configured to selectively receive an input of a first job mode processing and a second job mode processing. The information processing device further comprises a memory and a controller. The controller is configured to store information indicating one of the plurality of devices in a first region of the memory as a first default device corresponding to a first job mode. The controller is further configured to store information indicating one of the plurality of devices in a second region of the memory as a second default device corresponding to a second job mode. The controller is still further configured to read out the first default device corresponding to the first job mode from the first region of the memory when the input receiving unit receives the first job mode processing, and transmit command data commanding the first job mode processing to the read out first default device via the communication unit. Moreover, the controller is configured to read out the second default device corresponding to the second job mode from the second region of the memory when the input receiving unit receives the second job mode processing, and transmit command data commanding the second job mode processing to the read out second default device via the communication unit.

According to an embodiment of the present invention, an information processing method for an information processing device communicable with a plurality of devices is provided. The information processing device comprises a communication unit configured to communicate with the plurality of devices, an input receiving unit configured to selectively receive an input of a first job mode processing and a second job mode processing; and a memory. The method comprises a step of storing information indicating one of the plurality of devices in a first region of the memory as a first default device corresponding to a first job mode. The method further comprises a step of storing information indicating one of the plurality of devices in a second region of the memory as a second default device corresponding to a second job mode. The method still further comprises a step of reading out the first default device corresponding to the first job mode from the first region of the memory when the input receiving unit receives the first job mode processing, and transmitting command data commanding the first job mode processing to the read out first default device via the communication unit. Moreover, the method comprises a step of reading out the second default device corresponding to the second job mode from the second region of the memory when the input receiving unit receives the second job mode processing, and transmitting command data commanding the second job mode processing to the read out second default device via the communication unit.

According to an embodiment of the present invention, a non-transitory computer-readable medium bearing instructions for controlling an information processing device communicable with a plurality of devices is provided. The information processing device comprises a communication unit configured to communicate with the plurality of devices, an input receiving unit configured to selectively receive an input of a first job mode processing and a second job mode processing; and a memory. Said instructions, when executed, is arranged to cause a processor to perform steps. The steps comprise a step of storing information indicating one of the plurality of devices in a first region of the memory as a first default device corresponding to a first job mode. The steps further comprise a step of storing information indicating one of the plurality of devices in a second region of the memory as a second default device corresponding to a second job mode. The steps still further comprise a step of reading out the first default device corresponding to the first job mode from the first region of the memory when the input receiving unit receives the first job mode processing, and transmitting command data commanding the first job mode processing to the read out first default device via the communication unit. Moreover, the steps comprise a step of reading out the second default device corresponding to the second job mode from the second region of the memory when the input receiving unit receives the second job mode processing, and transmitting command data commanding the second job mode processing to the read out second default device via the communication unit.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein:

FIG. 6 illustrates a flowchart showing an example of a process of receiving a job mode and printing subject;

FIGS. 7A-7D illustrate a flowchart showing an example of a printing instruction process;

FIG. 11 illustrates an example of a table stored in flash memory 109; and

FIG. 12 illustrates an example of the table stored in the flash memory 109 after S805 of FIG. 8.

DESCRIPTION OF PREFERRED EMBODIMENTS

Figure 1:
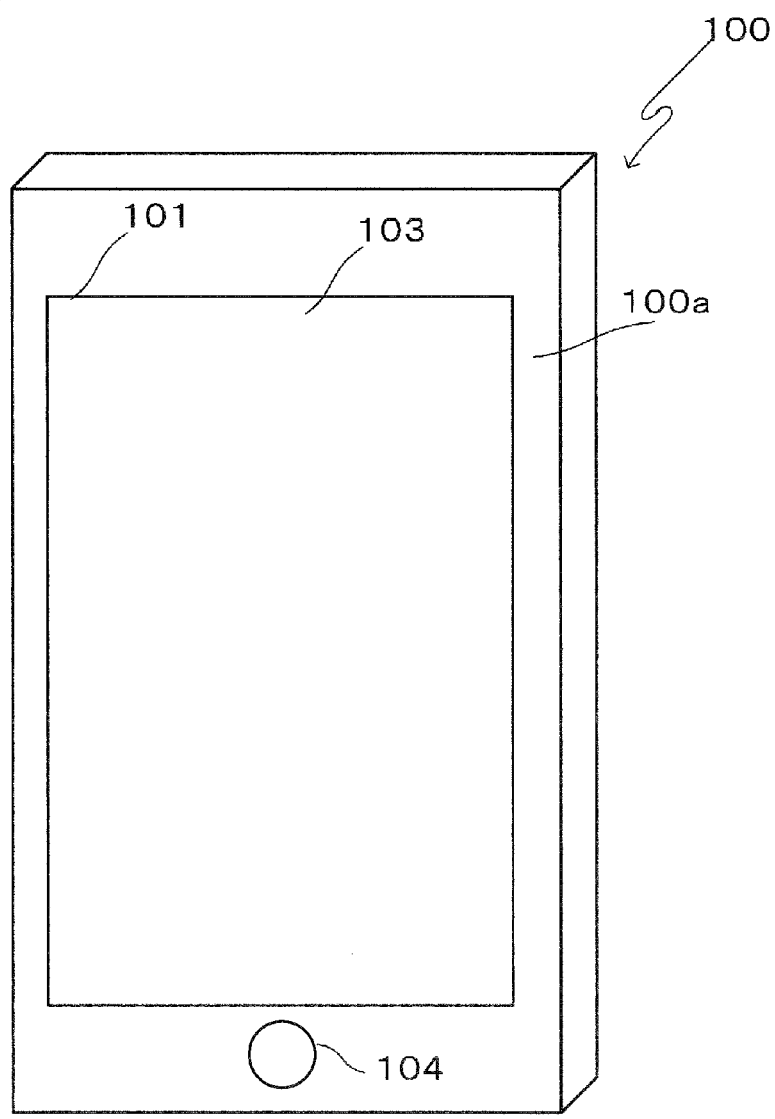
FIG. 1 illustrates an external view of an information processing device 100.

Embodiments of the invention and their features and advantages may be understood by referring to FIGS. 1-12, like numerals being used for like corresponding parts in the various drawings. Referring now to the drawings as needed, embodiments of the invention will be described. Needless to say, the embodiments described below are examples in which the invention is embodied, and the embodiments may be modified as needed without changing the scope of the invention.

First Embodiment

An information processing device 100 shown in FIG. 1 may be a portable type of device such as a mobile telephone or portable terminal device. A housing of the information processing device 100 may be formed in a flattened box form, and one side surface thereof may be formed as an operating surface 100a. A display region 101 may be provided in a central portion of the operating surface 100a, and an input interface 104 may be provided below the display region 101.

Figure 2:
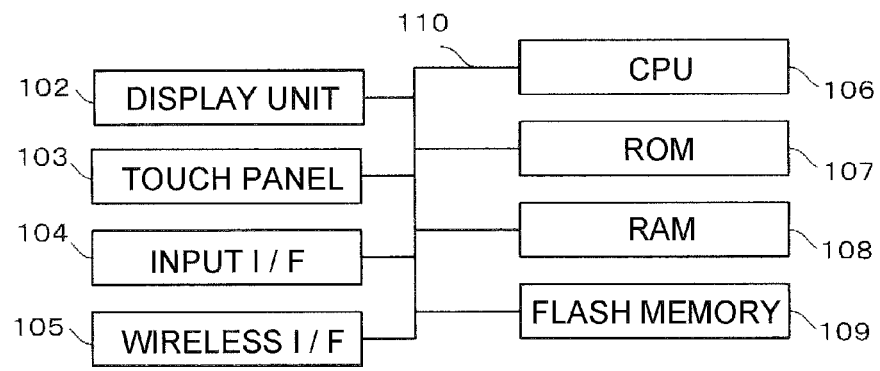
FIG. 2 illustrates a block diagram showing an example of an electrical configuration of the information processing device 100.

FIG. 2 illustrates a block diagram showing an electrical configuration of the information processing device 100. The information processing device 100 may include a display unit 102, a touch panel 103, the input interface 104, a wireless interface 105, a CPU 106, a ROM 107, a RAM 108, a flash memory 109, and the like, and these are mutually connected via an input/output port 110.

The display unit 102 may include the display region 101. The display unit 102 receives an image signal output in accordance with a command of the CPU 106, and causes an image to be displayed in the display region 101 based on the image signal received. An LCD, an organic EL panel, or the like, may be used as the display unit 102.

The touch panel 103 is formed with a transparent member, and is disposed so as to cover a surface of the display region 101. The touch panel 103 detects a position touched by a user's finger or the like, and outputs detected position information to the CPU 106. Hereafter, the CPU 106 receiving the position information output from the touch panel 103 will be expressed as the CPU 106 receiving a touch, or the like.

The input interface 104 may be, for example, an operating button. When the input interface 104 is depressed, the information processing device 100 is activated.

Figure 3:
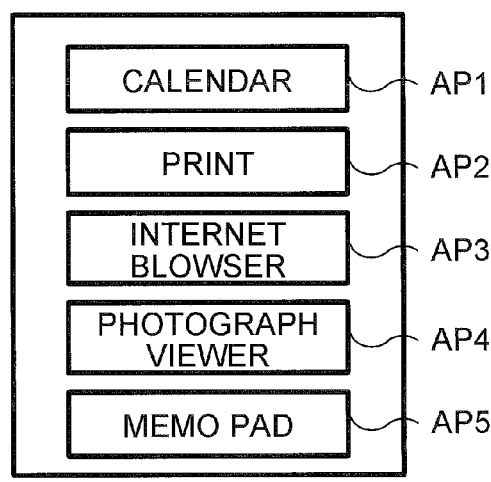
FIG. 3 illustrates an example of an application icon display screen.

The CPU 106 controls each portion connected to the input-output port 110 in accordance with a program stored in the ROM 107 or flash memory 109. As an example, a program executed by the CPU 106 may be stored in the ROM 107. The RAM 108 temporarily stores information necessary for a process of the CPU 106. The flash memory 109 is a non-volatile memory. Image data, document data, and the like, can be stored in the flash memory 109. Also, although details will be described hereafter, the flash memory 109 may store an IP address and model number of a default printer, a referenced other job mode default printer, and the like, for each job mode. Furthermore, various application programs (hereafter called simply applications) may be stored in the flash memory 109. Icons of the applications stored in the flash memory 109 may be displayed in the display region 101. FIG. 3 illustrates an example of an application icon display screen. Herein, icons of a calendar application AP1, a print application AP2, an Internet browser application AP3, a photograph viewer application AP4, and a memo pad application AP5 are displayed. When the CPU 106 receives a touch of one of the icons, the CPU 106 activates the application corresponding to the icon touched.

Figure 4:
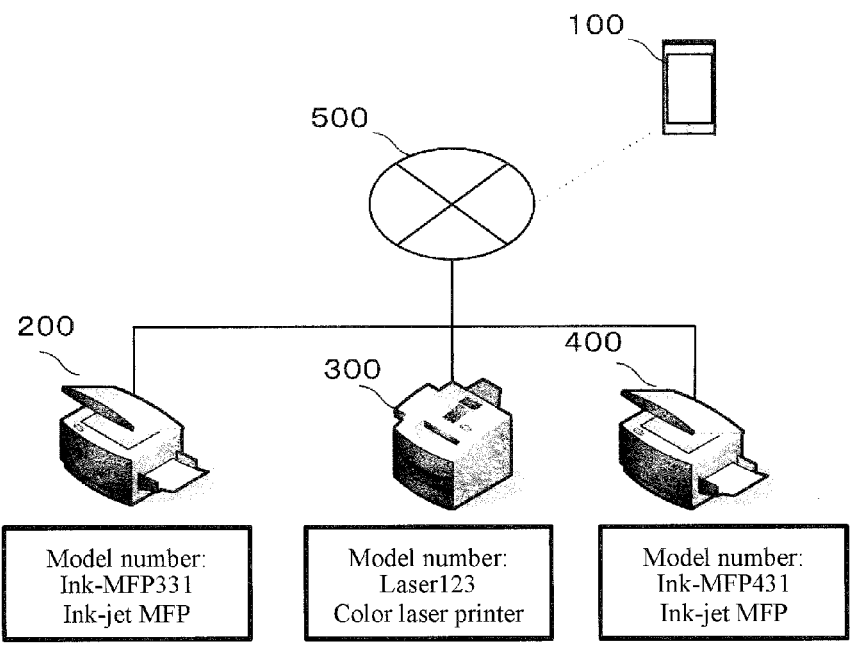
FIG. 4 illustrates an example of a schematic view of a connection between the information processing device 100 and a printer that carries out communication with the information processing device 100.

FIG. 4 illustrates a schematic view of a connection between the information processing device 100 and a printer that carries out communication with the information processing device 100. The information processing device 100 carries out communication with an access point 500, using a wireless LAN type wireless communication, via the wireless interface 105. As an example of a device, an ink jet MFP 200, an ink jet MFP 400, and a color laser printer 300 are connected to the access point 500. Herein, MFP indicates a multifunction peripheral that may include a printing function, a scanning function, and a copying function. The information processing device 100 may execute the print application AP2, and transmit a printing request to the ink jet MFP 200, ink jet MFP 400, or color laser printer 300 via the access point 500. That is, the information processing device 100 can use the ink jet MFP 200, ink jet MFP 400, or color laser printer 300 via the access point 500.

Figure 5:
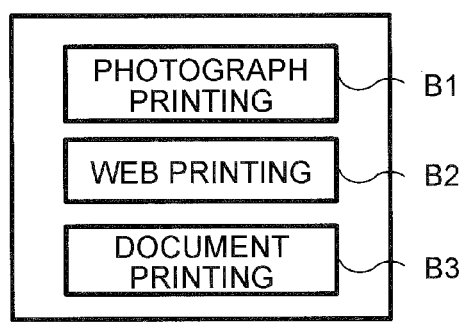
FIG. 5 illustrates an example of a job mode selection screen.
Figure 7A:
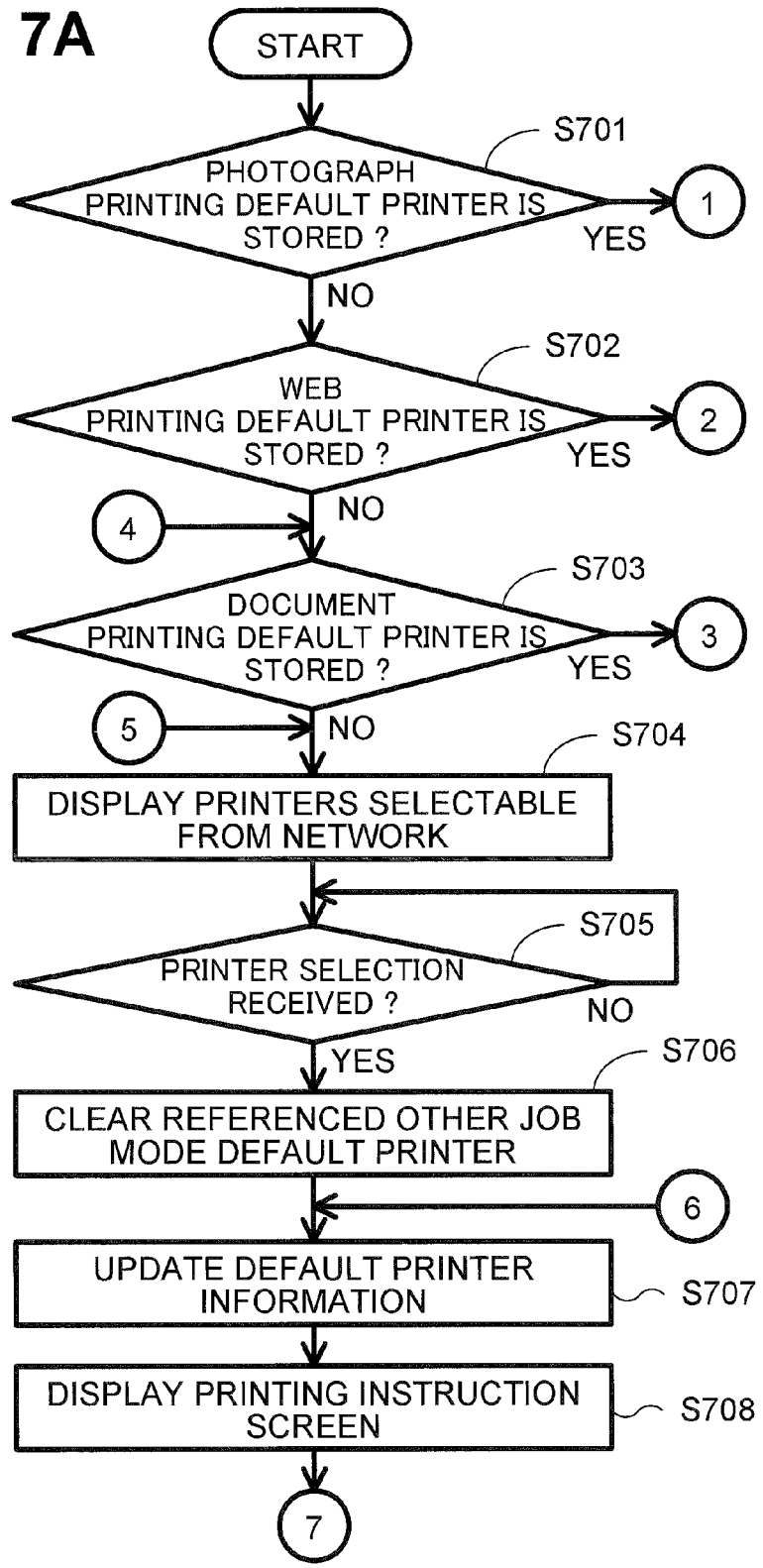
Figure 7B:
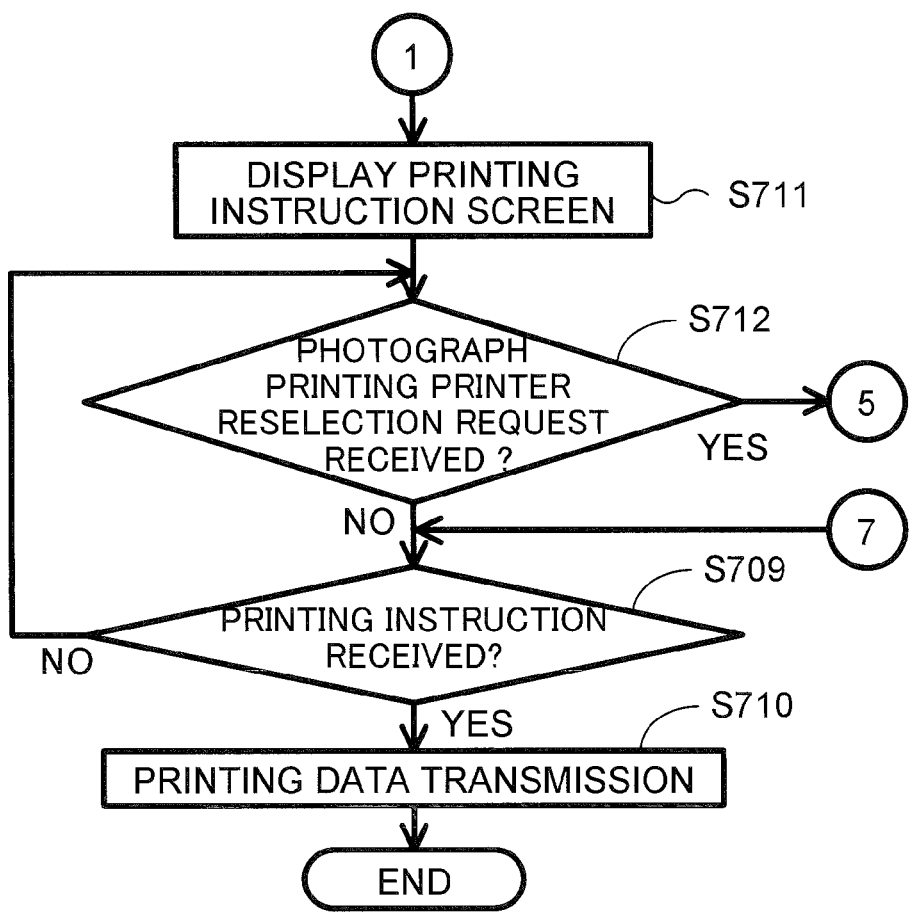
Figure 8:
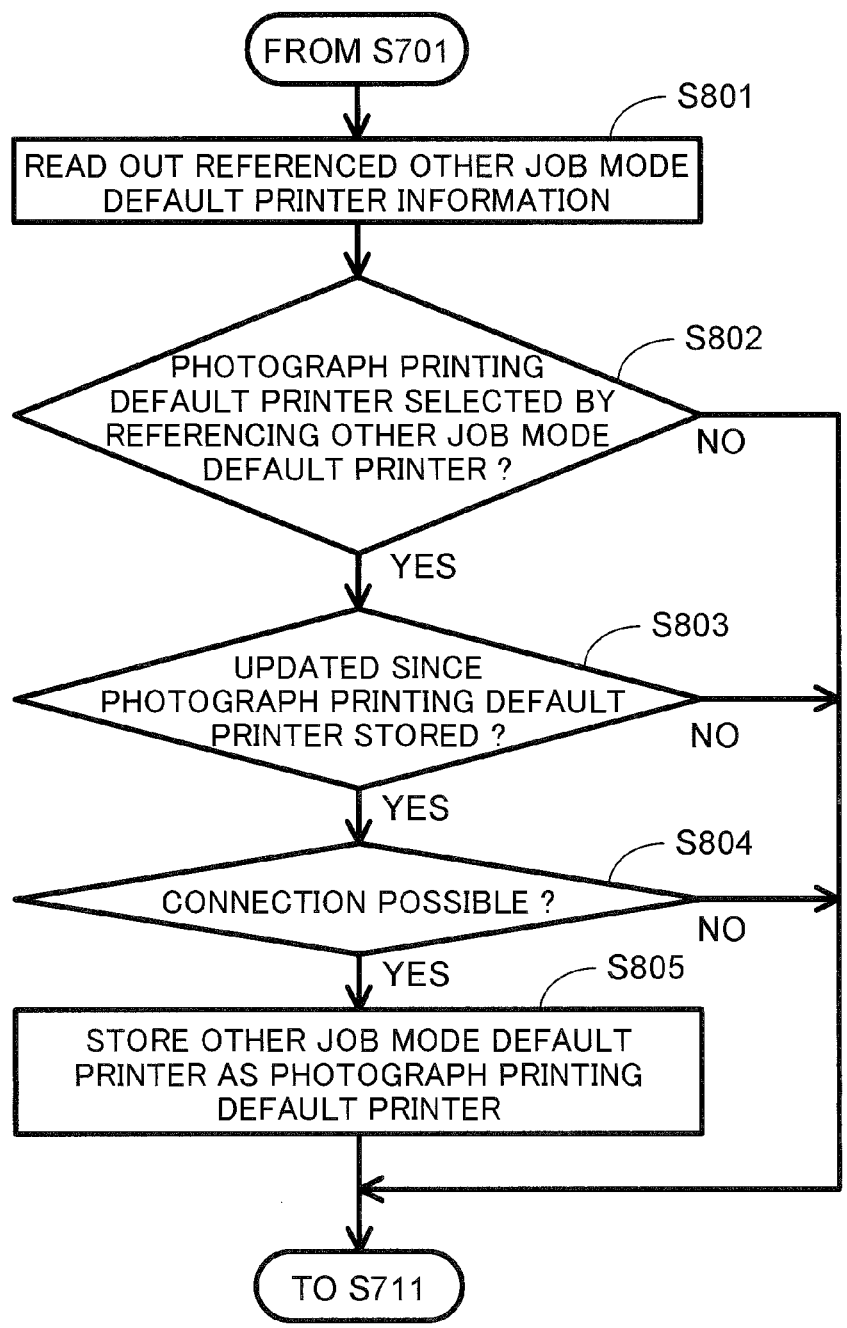
FIG. 8 illustrates a flowchart showing an example of a process of updating a default printer in accordance with a change of a referenced other job mode default printer.

FIG. 5 illustrates a job mode selection screen displayed in the display region 101 after the print application has been activated. In the embodiment, a photograph printing icon B1 for selecting a photograph printing that causes a printer to print photograph data, a web printing icon B2 for selecting a web printing that causes a printing of a web page, and a document printing icon B3 for selecting a document printing that causes a printing of document data, may be displayed as icons indicating job modes. The CPU 106, when receiving a touch of the job mode icon B1, B2, or B3 in the display region 101, determines that the job mode indicated by the icon touched has been selected. When the photograph printing is selected, the information processing device 100 may transmit a request to print image data of JPEG, Bitmap, GIF, or the like, to a printer, and a process (hereafter called a photograph printing process) causing a printing to be executed is carried out by the printer. When the web printing is selected, the information processing device 100 may transmit a request to print a web page to a corresponding printer, and a process (hereafter called a web printing process) executing a printing is carried out by the printer. When the document printing is selected, the information processing device 100 may transmit a request to print document data of PDF, txt, doc, or the like, to a corresponding printer, and a process (hereafter called a document printing process) executing a printing is carried out by the printer.

Hereafter, referring to FIGS. 6 and 7A-7D, a description will be given of a process whereby the CPU 106 controls each portion in accordance with the print application AP2. FIG. 6 illustrates a process of receiving the job mode and printing subject after the print application AP2 has been activated. The CPU 106 may determines whether it has received a touch of any one of the photograph printing icon B1, the web printing icon B2, and the document printing icon B3 (S601). If the CPU 106 determines that it has received a touch of any one (S601: Yes), the CPU process proceeds to S602. Meanwhile, if the CPU 106 determines that it has not received a touch of an icon (S601: No), the CPU 106 may repeat the determination of S601 until it receives a touch.

In S602, the CPU 106 receives a selection of data which are to be the printing subject from among data corresponding to the job mode received in S601. In the case of the photograph printing or document printing, when the data which are to be the printing subject are stored in the flash memory 109, it is possible, as an example, to select the printing subject in the following way. The CPU 106 may retrieve image data or document data which are to be the printing subject from the flash memory 109, and may display a list of file names and thumbnails of the data in the display region 101. The CPU 106 receives a touch of one of the file names and thumbnails displayed in the display region 101. In the case of the web printing, it is possible, as an example, to select the printing subject in the following way. The CPU 106 may display a web page requested by the user in the display region 101. The CPU 106 may display a URL of the web page, and an icon for designating the displayed web page as the printing subject, in the display region 101 together with the web page. When receiving a touch of the icon, the CPU 106 receives a designation of the displayed web page as the printing subject.

In S603, the CPU 106 stores location information of the data received as the printing subject in the RAM 108 (S603). As an example, location information including an absolute path may be stored in the RAM 108 when the data are image data or document data, and the URL of the web page may be stored in the RAM 108 when the data are a web page. Then, the process is finished, and the CPU 106 proceeds to a printing instruction process.

A description will be given, referring to FIGS. 7A-7D, of a printing instruction process when the photograph printing is selected in S601 of FIG. 6. In S701, the CPU 106 may reference the flash memory 109, and may determine whether the IP address of a photograph printing default printer is stored therein (S701). Herein, a default printer is a printer set in advance in order to reduce the number of operations of the user selecting a printer when the information processing device 100 transmits a printing request in order to cause a printing process to be executed. The information processing device 100 may store the IP address of the default printer, and information relating to the default printer, for each job mode, the photograph printing, the web printing, and the document printing. An example thereof is illustrated in FIG. 11 as a table A. The table A showing the IP address and model number of the default printer, and a referenced other job mode default printer, may be stored for each job mode in the flash memory 109. A detailed description will be given hereafter of the referenced other job mode default printer. If the CPU 106 determines that the IP address of the photograph printing default printer is stored in the table A of the flash memory 109 (S701: Yes), the CPU 106 executes a process of S711, to be described hereafter. Meanwhile, if the CPU 106 determines that the IP address of the photograph printing default printer is not stored in the table A (S701: No), the CPU 106 executes a process of S702, to be described hereafter.

In S702, the CPU 106 references the table A stored in the flash memory 109, and determines whether the IP address of a web printing default printer is stored therein (S702). If the CPU 106 determines that the IP address of the web printing default printer is stored in the table A (S702: Yes), the CPU 106 executes a process of S713, to be described hereafter, while if the CPU 106 determines that the IP address of the web printing default printer is not stored in the table A (S702: No), the CPU 106 executes a process of S703, to be described hereafter.

In S703, the CPU 106 references the table A stored in the flash memory 109, and determines whether the IP address of a document printing default printer is stored therein (S703). If the CPU 106 determines that the IP address of the document printing default printer is stored in the table A (S703: Yes), the CPU 106 executes a process of S715, to be described hereafter, while if the CPU 106 determines that the IP address of the document printing default printer is not stored in the table A (S703: No), the CPU 106 executes a process of S704, to be described hereafter.

Figures 9, 10:
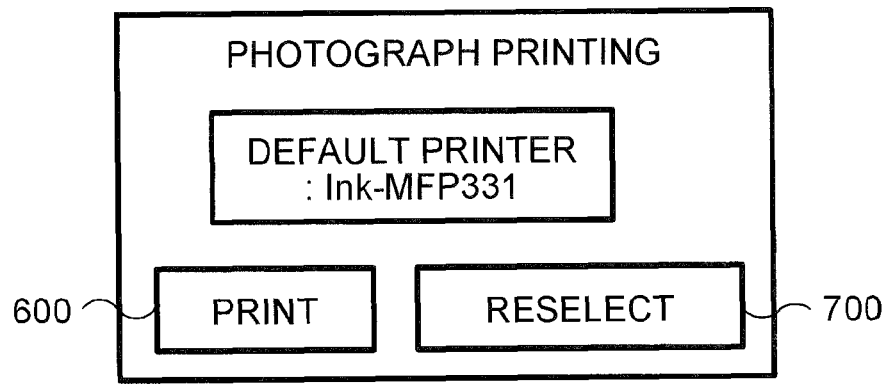
FIG. 9 illustrates an example of a printing instruction screen.
FIG. 10 illustrates an example of information stored in RAM 108 in S704 of FIG. 7A.

In S704, the CPU 106 displays the model number of a printer selectable from a network in the display region 101 (S704). This process may be carried out in the following way. The CPU 106 controls the wireless interface 105, and causes a packet requesting a printer to return the model number of the printer, and information relating to a function thereof, to be broadcasted on a network to which the information processing device 100 is connected. On so doing, there is a response from each printer connected to the network. The wireless interface 105 receives a packet including the model number of the printer, and information relating to the function thereof, returned from the printer. The packet received by the wireless interface 105 includes the IP address of the printer as a source address and the IP address of the information processing device 100 as a destination address. Then, the CPU 106 correlates the printer model number, information relating to the function thereof, and printer IP address received by the wireless interface 105, and stores them in the RAM 108. FIG. 10 illustrates an example of information stored in the RAM 108 by the CPU 106 in the embodiment. Then, the CPU 106 displays a list of extracted printer model numbers in the display region 101.

In S705, the CPU 106 determines whether it has received a selection of a printer from the list displayed in the display region 101 in S704 (S705). Specifically, the CPU 106 determines whether it has received a touch of the model number of a printer displayed in the display region 101. If the CPU 106 determines that it has received the selection of a printer (S705: Yes), the CPU 106 executes a process of S706, to be described hereafter. Meanwhile, if the CPU 106 determines that it has not received the selection of a printer (S705: No), the CPU 106 may wait to receive the selection of a printer by repeating the determination of S705.

In S706, the CPU 106 clears a "referenced other job mode default printer" region in the table A for the photograph printing default printer.

In S707, the CPU 106 stores the printer IP address and model number received in S705, or in S714, to be described hereafter, or S716, to be described hereafter, in photograph printing default printer IP address and model number regions of the table A stored in the flash memory 109.

In S708, the CPU 106 displays a printing instruction screen in the display region 101. An example of the printing instruction screen is illustrated in FIG. 9. The model number of the photograph printing default printer, a printing instruction icon 600, and a reselection icon 700 are displayed on the printing instruction screen. The photograph printing default printer displayed on the printing instruction screen is displayed on the printing instruction screen by the CPU 106 retrieving the model number of the photograph printing default printer from the table A stored in the flash memory 109.

In S709, the CPU 106 determines whether it has received a printing instruction (S709). Specifically, the CPU 106 determines whether it has received a touch of the printing icon 600 on the printing instruction screen. If the CPU 106 determines that it has not received a printing instruction (S709: No), the CPU 106 determines in S712 whether it has received a reselection request. Specifically, the CPU 106 determines whether it has received a touch of the reselection icon 700. If the CPU 106 has not received a reselection (S712: No), the CPU 106 executes the process of S709 again. In this way, the CPU 106 may wait to receive a touch of the printing icon 600 or reselection icon 700 by repeating the determinations of S709 and S712. If the CPU 106 determines that it has received a printing instruction (S709: Yes), the CPU 106 executes a process of S710, to be described hereafter. Meanwhile, if the CPU 106 has received a reselection (S712: Yes), the CPU 106 executes the process of S704.

In S710, the CPU 106 sets the photograph printing default printer IP address retrieved from the table A stored in the flash memory 109 as a destination, controls the wireless interface 105, and transmits a request to print the image data for which the selection has been received in S602 of FIG. 6 to the photograph printing default printer (S710). Then, the CPU 106 finishes the printing instruction process.

Next, a description will be given of a process when the CPU 106 determines in S701 that the IP address of the photograph printing default printer is stored in the table A of the flash memory 109 (S701: Yes). In S711, the CPU 106 displays a printing instruction screen in the display region 101 (S711). The printing instruction screen may be the same as that displayed in S708. Also, in the same way as in S708, the photograph printing default printer is displayed on the printing instruction screen by the CPU 106 retrieving the model number of the photograph printing default printer from the table A stored in the flash memory 109.

In S712, the CPU 106 determines whether it has received a reselection of the photograph printing default printer (S712). Specifically, the CPU 106 determines whether it has received a touch of the reselection icon 700 on the printing instruction screen. If the CPU 106 determines that it has received a reselection of the photograph printing default printer (S712: Yes), the CPU 106 executes the process of S704. Meanwhile, if the CPU 106 determines that it has not received a reselection of the photograph printing default printer (S712: No), the CPU 106 executes the process of S709. Next, if the CPU 106 determines that it has received a printing instruction (S709: Yes), the CPU 106, in step S710, sets the photograph printing default printer IP address retrieved from the table A stored in the flash memory 109 as a destination, controls the wireless interface 105, and transmits a request to print the image data for which the selection has been received in S602 of FIG. 6 to the photograph printing default printer (S710).

Next, a description will be given of a process when the CPU 106 determines in S701 that the IP address of the photograph printing default printer is not stored in the table A of the flash memory 109 (S701: No), and when the CPU 106 determines in S702 that the IP address of the web printing default printer is stored in the table A (S702: Yes). In S713, the CPU 106 determines whether communication with the web printing default printer is possible. Specifically, this process may be carried out in the following way. The CPU 106 sets the web printing default printer IP address retrieved from the table A stored in the flash memory 109 as a destination, controls the wireless interface 105 to transmit a packet requesting a response. Then, the CPU 106 determines whether there is a response from the web printing default printer within a predetermined time. Then, if there is a response within the predetermined time, the CPU 106 determines that communication with the web printing default printer is possible (S713: Yes), and executes a process of S714, to be described hereafter. Meanwhile, if there is no response within the predetermined time, the CPU 106 determines that communication with the web printing default printer is not possible (S713: No), and executes the process of S703.

In S714, the CPU 106 stores the web printing default printer in the table A stored in the flash memory 109 as a referenced other job mode default printer of the photograph printing default printer. Also, the CPU 106 receives the web printing default printer as the photograph printing default printer. Then, in S707, the CPU 106 stores the web printing default printer IP address and model number in the regions in which are stored the photograph printing default printer IP address and model number respectively. That is, when the processes are executed in the order S714, S707, a printer the same as the web printing default printer is stored as the photograph printing default printer. It is for this reason that the web printing default printer is stored in S714 as the referenced other job mode default printer of the photograph printing default printer. Meanwhile, in S706, the CPU 106 clears the "referenced other job mode default printer" region in the table A. This is because the photograph printing default printer is received from the user in S705.

Next, a description will be given of a process when the CPU 106 determines in S701 that the IP address of the photograph printing default printer is not stored in the table A of the flash memory 109 (S701: No), and when the CPU 106 determines in S703 that the IP address of the document printing default printer is stored in the table A (S703: Yes). In S715, the CPU 106 determines whether communication with the document printing default printer is possible. As the details are the same as in S713, they will be omitted. If the CPU 106 determines that communication with the document printing default printer is possible (S715: Yes), it executes a process of S716, to be described hereafter, while if the CPU 106 determines that communication with the document printing default printer is not possible (S715: No), the CPU 106 executes the process of S704.

In S716, the CPU 106 stores the document printing default printer in the table A stored in the flash memory 109 as a referenced other job mode default printer of the photograph printing default printer. Also, the CPU 106 receives the document printing default printer as the photograph printing default printer. Then, in S707, the CPU 106 stores the document printing default printer IP address and model number in the regions in which are stored the photograph printing default printer IP address and model number respectively. When the processes are executed in the order S716, S707, a printer the same as the document printing default printer is stored as the photograph printing default printer.

Also, in the event too that the web printing or document printing is selected in S601 of FIG. 6, basically the same processes are executed, excepting only that regions of the table A stored in the flash memory 109 each is stored in and retrieved from are different. A printing instruction process when the web printing is selected is configured, as an example, by interchanging photograph printing default printer and web printing default printer with respect to steps of FIGS. 7A-7D. Then, a printing instruction process when the document printing is selected is configured, as an example, by interchanging photograph printing default printer and document printing default printer with respect to steps of FIGS. 7A-7D.

In this way, the information processing device 100 according to the embodiment can set a default printer for each job mode, the photograph printing, the web printing, and the document printing. For this reason, as it may be possible to use the information processing device 100 without selecting an optimal printer for each job mode every time a printing is carried out, it may be more convenient.

Also, when an other job mode default printer is already stored when selecting a default printer for one job mode, the information processing device 100 presents the other job mode default printer to the user as the default printer for the one job mode. When a printing is carried out with the printer presented, the printer used is automatically stored as the default printer. For this reason, there may be no longer any need for the user to directly select an individual default printer for every job mode, which may be more convenient for the user.

Second Embodiment

A description will be given of a second embodiment. The second embodiment includes the same configuration as the first embodiment. A difference lies in the point that a default printer update process based on a change of a referenced other job mode default printer is inserted between S701 of FIG. 7A and S711 of FIG. 7B. Hereafter, referring to FIG. 8, a description will be given of the default printer update process based on the change of the referenced other job mode default printer. It will be assumed that the photograph printing is selected as the printing subject in S601 of FIG. 6.

In S801, the CPU 106 reads out what a referenced other job mode default printer has been when the photograph printing default printer has been selected previously. Specifically, the CPU 106 reads out the "referenced other job mode default printer" region of the photograph printing default printer in the table A stored in the flash memory 109. In the example shown in FIG. 11, the fact that the web printing default printer has been referenced is stored for the photograph printing default printer. Meanwhile, the "referenced other job mode default printer" region of the web printing default printer in the table A is blank. This indicates that the web printing default printer has been selected by an instruction from the user, and that no other job mode default printer has been referenced. Next, the process of the CPU 106 proceeds to S802.

In S802, the CPU 106 determines whether the photograph printing default printer has been selected by referencing an other job mode default printer. Specifically, the CPU 106 determines whether an other job mode default printer (in this case, the web printing default printer or document printing default printer) is stored in the "referenced other job mode default printer" region of the photograph printing default printer read out in S801. If the CPU 106 determines that an other job mode default printer is stored in the "referenced other job mode default printer" region (S802: Yes), the CPU 106 executes a process of S803, to be described hereafter. Meanwhile, if the CPU 106 determines that no other job mode default printer is stored in the "referenced other job mode default printer" region (for example, it is blank) (S802: No), the CPU 106 proceeds to the process of S711 without updating the default printer.

In S803, the CPU 106 determines whether the other job mode default printer referenced when the photograph printing default printer has been stored previously has been updated since the selection of the photograph printing default printer. An example of a specific process of step S803 will be described using the table A shown in FIG. 11. The CPU 106 determines that the web printing default printer is stored in the "referenced other job mode default printer" region of the photograph printing default printer in the table A stored in the flash memory 109. Thereupon, the CPU 106 retrieves the IP address and model number of the web printing default printer from the table A. Continuing, the CPU 106 compares the retrieved web printing default printer IP address and model number with the photograph printing default printer IP address and model number respectively, and determines whether they are the same. In the table A shown in FIG. 11, neither the IP address nor model number of the photograph printing default printer coincide with the IP address and model number of the web printing default printer. Because of this, it is understood that the web printing default printer has been changed between the time the photograph printing default printer being previously stored and the time of the determination of S803. For this reason, the CPU 106 determines that the other job mode default printer referenced when the photograph printing default printer has been stored previously has been updated since the selection of the photograph printing default printer (S803: Yes), and executes a process of S804, to be described hereafter. Meanwhile, in the event that, in the table A, both the IP address and model number of the photograph printing default printer coincide with the IP address and model number of the web printing default printer, the CPU 106 determines that the other job mode default printer referenced when the photograph printing default printer has been stored previously has not been updated since the selection of the photograph printing default printer (S803: No), and proceeds to the process of S711 without updating the default printer.

In S804, the CPU 106 determines whether communication with the updated other job mode default printer is possible after referencing upon storing the photograph printing default printer. An example of a specific process of step S804 will be described using FIG. 11. As the web printing default printer is stored as a referenced other job mode default printer for the photograph printing default printer in the table A stored in the flash memory 109, the CPU 106 retrieves the IP address of the web printing default printer from the table A. The CPU 106 determines whether communication is possible with the current web printing default printer, using the same method as in S713. If the CPU 106 determines that communication is possible with the current web printing default printer (S804: Yes), the CPU 106 executes a process of S805, to be described hereafter. Meanwhile, if the CPU 106 determines that communication is not possible with the current web printing default printer (S804: No), the CPU 106 proceeds to the process of S711 without updating the default printer.

In S805, the CPU 106 stores the current other job mode default printer (in this case, the current web printing default printer) as the photograph printing default printer (S805). An example of a specific process of step S805 will be described using FIG. 11. The CPU 106 retrieves the IP address and model number of the web printing default printer from the table A stored in the flash memory 109, and stores them in the photograph printing default printer IP address and model number regions of the table A. FIG. 12 illustrates the table A after S805 is executed.

Also, in the same way as in the first embodiment, in the event too that the web printing or document printing is selected in S601 of FIG. 6, basically the same processes are executed, excepting only that the regions of the table A stored in the flash memory 109 each is stored in and retrieved from are different. A default printer update process when the web printing is selected is configured, as an example, by interchanging the photograph printing default printer and web printing default printer with respect to steps of FIG. 8. Then, a default printer update process when the document printing is selected is configured, as an example, by interchanging the photograph printing default printer and document printing default printer with respect to steps of FIG. 8.

In this way, in the second embodiment, when one job mode default printer is stored by referencing an other job mode default printer, that fact is stored. Then, when the other job mode default printer is changed, the information processing device 100 also changes the one job mode default printer, provided that it has not been selected directly by the user, in accordance with the change of the other job mode default printer. Because of this, the user can use a latest printer as the default printer, without directly carrying out a change of printer for each job mode. In this way, in the second embodiment, it may enhance the usability.

The invention is not limited in any way to the heretofore described embodiments, and can be embodied in various ways without departing from the technical scope of the invention. The print application job modes not being limited to the photograph printing, web printing, and document printing, there may be more or less than this. Also, the job modes not being limited to printing, there may also be a scanning. Then, in the event that the scanning is selected in S601, S602 and S603 of FIG. 6 are no longer necessary. Also, in S711 of FIG. 7B and S708 of FIG. 7A, the CPU 106 may display a scanning instruction screen in place of the printing instruction screen. In S704, the CPU 106 displays the model number of a device including a scanning function selectable on the network in the display region 101.

Also, the IP address and printer model number are used in the heretofore described embodiments as information for identifying the printer. However, a MAC address or URL may be used in place of the IP address. When using the URL, it is sufficient that the CPU 106 acquires a corresponding IP address, and uses the acquired IP address in communication with the device.

Also, the information processing device 100 may be of a configuration such as to carry out a wired communication.

What is claimed is:

1. An information processing device communicable with a plurality of devices, comprising:
a communication interface configured to communicate with the plurality of devices;
an input receiving device configured to receive an input, the input receiving device being configured to selectively receive an input of a first job mode processing and a second job mode processing;
a memory; and
a controller configured to:
store, in a first region of the memory, first identification information that specifies a first default device that is associated with the first job mode processing, the first identification information including:
first designation information that specifically identifies a first one of the plurality of devices, such that the first one of the plurality of devices specifically identified by the first designation information is specified as the first default device; and
first address information specifying an address of the first one of the plurality of devices specifically identified by the first designation information,
wherein the first job mode processing is a process of processing a first type of file structure, and
wherein the first one of the plurality of devices that is specified as the first default device is configured to selectively perform both the first job mode processing and the second job mode processing;
store, in a second region of the memory, second identification information that specifies a second default device that is associated with the second job mode processing, the second identification information including:
second designation information that specifically identifies a second one of the plurality of devices, such that the second one of the plurality of devices specifically identified by the second designation information is specified as the second default device; and
second address information specifying an address of the second one of the plurality of devices specifically identified by the second designation information,
wherein the second job mode processing is a process of processing a second type of file structure, and
wherein the second one of the plurality of devices that is specified as the default device is configured to selectively perform both the first job mode processing and the second job mode processing;
read out the first identification information from the first region of the memory when the input receiving device receives the first job mode processing, and transmit command data commanding the first job mode processing to the first one of the plurality of devices specifically identified by the first designation information in the read out first identification information via the communication interface; and
read out the second identification information from the second region of the memory when the input receiving device receives the second job mode processing, and transmit command data commanding the second job mode processing to the second one of the plurality of devices specifically identified by the second designation information in the read out second identification information via the communication interface.

2. The information processing device according to claim 1, wherein each of the first job mode processing and second job mode processing is a process of printing.

3. The information processing device according to claim 2, wherein the first job mode processing is one of a process of photograph printing in which a file structure representing image data is printed, a process of web printing in which a file structure representing a web page is printed, and a process of document printing in which a file structure representing document data is printed, and the second job mode processing is another of the process of photograph printing, the process of web printing, and the process of document printing.

4. The information processing device according to claim 1, wherein a first IP address indicating an address of the first one of the plurality of devices specifically identified by the first designation information is stored in the first region as the first address information and a second IP address indicating an address of the second one of the plurality of devices specifically identified by the second designation information is stored in the second region as the second address information.

5. The information processing device according to claim 1, wherein the controller, if the first identification information is not written into the first region of the memory when the input receiving device receives the first job mode processing, reads out the second identification information from the second region of the memory, and transmits command data commanding the first job mode processing to the second one of the plurality of devices specifically identified by the second designation information in the read out second identification information via the communication interface.

6. The information processing device according to claim 5, wherein the controller, if the first identification information is not written into the first region of the memory when the input receiving device receives the first job mode processing, stores the second designation information and the second address information in the memory as the first identification information.

7. The information processing device according to claim 6, wherein the controller stores the second designation information and the second address information in the first region of the memory as the first identification information.

8. The information processing device according to claim 6, wherein the controller stores, in the memory, reference history information indicating that the second designation information and the second address information have been stored as the first identification information.

9. The information processing device according to claim 8, wherein the controller determines whether the reference history information is stored in the memory or not, and the controller, if the controller determines that the reference history information is stored in the memory, determines whether the first one of the plurality of devices specifically identified by the first designation information stored in the first region of the memory is the same device as the second one of the plurality of devices specifically identified by the second designation information currently stored in the second region of the memory.

10. The information processing device according to claim 9, wherein, when the controller determines that the first one of the plurality of devices specifically identified by the first designation information stored in the first region of the memory and the second one of the plurality of devices specifically identified by the second designation information currently stored in the second region of the memory are not the same, the controller transmits command data commanding the first job mode processing to the second one of the plurality of devices specifically identified by the second designation information currently stored in the second region of the memory.

11. The information processing device according to claim 9, wherein, when the controller determines that the first one of the plurality of devices specifically identified by first designation information stored in the first region of the memory and the second one of the plurality of devices specifically identified by the second designation information currently stored in the second region of the memory are not the same, the controller updates the first identification information stored in the first region of the memory with the second designation information and the second address information currently stored in the second region of the memory.

12. The information processing device according to claim 1, wherein:
the controller, if the first identification information is not written into the first region of the memory when the input receiving device receives the first job mode processing, reads out the second identification information from the second region of the memory;
the controller determines whether communication with the second one of the plurality of devices specifically identified by the second designation information via the communication interface is possible or not; and
when the controller determines that communication with the second one of the plurality of devices specifically identified by the second designation information via the communication interface is not possible, the controller does not transmit command data commanding the first job mode processing to the second one of the plurality of devices specifically identified by the second designation information in the read out second identification information.

13. The information processing device according to claim 12, wherein the controller is further configured to:
store, in a third region of the memory, third identification information that specifies a third default device that is that is associated with a third job mode processing, the third identification information including:
third designation information that specifically identifies a third one of the plurality of devices, such that the third one of the plurality of devices specifically identified by the third designation information is specified as the third default device; and
third address information specifying an address of the third one of the plurality of devices specifically identified by the third designation information,
wherein the third job mode processing is a process of processing a third type of file structure; and
read out the third identification information from the third region of the memory when the input receiving device receives a third job mode processing, and transmit command data commanding the third job mode processing to the third one of the plurality of devices specifically identified by the third designation information in the read out third identification information via the communication interface,
wherein, when the controller determines that communication with the second one of the plurality of devices specifically identified by the second designation information via the communication interface is not possible, the controller reads out the third identification information from the third region of the memory, and transmits command data commanding the first job mode processing to the third one of the plurality of devices specifically identified by the third designation information in the read out third identification information via the communication interface.

14. An information processing method for an information processing device communicable with a plurality of devices, the information processing device comprising a communication interface configured to communicate with the plurality of devices, an input receiving device configured to selectively receive an input of a first job mode processing and a second job mode processing; and a memory, the method comprising steps of:
  storing, in a first region of the memory, first identification information that specifies a first default device that is associated with the first job mode processing, the first identification information including:
    first designation information that specifically identifies a first one of the plurality of devices, such that the first one of the plurality of devices specifically identified by the first designation information is specified as the first default device; and
    first address information specifying an address of the first one of the plurality of devices specifically identified by the first designation information,
      wherein the first job mode processing is a process of processing a first type of file structure, and
      wherein the first one of the plurality of devices that is specified as the first default device is configured to selectively perform both the first job mode processing and the second job mode processing;
  storing, in a second region of the memory, second identification information that specifies a second default device that is associated with the second job mode processing, the second identification information including:
    second designation information that specifically identifies a second one of the plurality of devices, such that the second one of the plurality of devices specifically identified by the second designation information is specified as the second default device; and
    second address information specifying an address of the second one of the plurality of devices specifically identified by the second designation information,
      wherein the second job mode processing is a process of processing a second type of file structure, and
      wherein the second one of the plurality of devices that is specified as the default device is configured to selectively perform both the first job mode processing and the second job mode processing;
  reading out the first identification information from the first region of the memory when the input receiving device receives the first job mode processing, and transmitting command data commanding the first job mode processing to the first one of the plurality of devices specifically identified by the first designation information in the read out first identification information via the communication interface; and
  reading out the second identification information from the second region of the memory when the input receiving device receives the second job mode processing, and transmitting command data commanding the second job mode processing to the second one of the plurality of devices specifically identified by the second designation information in the read out second identification information via the communication interface.

15. A non-transitory computer-readable medium bearing instructions for controlling an information processing device communicable with a plurality of devices, the information processing device comprising a communication interface configured to communicate with the plurality of devices, an input receiving device configured to selectively receive an input of a first job mode processing and a second job mode processing; and a memory, said instructions, when executed, being arranged to cause a processor to perform steps of:
  (a) storing, in a first region of the memory, first identification information that specifies a first default device that is associated with the first job mode processing, the first identification information including:
    first designation information that specifically identifies a first one of the plurality of devices, such that the first one of the plurality of devices specifically identified by the first designation information is specified as the first default device; and
    first address information specifying an address of the first one of the plurality of devices specifically identified by the first designation information,
      wherein the first job mode processing is a process of processing a first type of file structure, and
      wherein the first one of the plurality of devices that is specified as the first default device is configured to selectively perform both the first job mode processing and the second job mode processing;
  (b) storing, in a second region of the memory, second identification information that specifies a second default device that is associated with the second job mode processing, the second identification information including:
    second designation information that specifically identifies a second one of the plurality of devices, such that the second one of the plurality of devices specifically identified by the second designation information is specified as the second default device; and
    second address information specifying an address of the second one of the plurality of devices specifically identified by the second designation information,
      wherein the second job mode processing is a process of processing a second type of file structure, and
      wherein the second one of the plurality of devices that is specified as the default device is configured to selectively perform both the first job mode processing and the second job mode processing;
  (c) reading out the first identification information from the first region of the memory when the input receiving device receives the first job mode processing, and transmitting command data commanding the first job mode processing to the first one of the plurality of devices specifically identified by the first designation information in the read out first identification information via the communication interface; and
  (d) reading out the second identification information from the second region of the memory when the input receiving device receives the second job mode processing, and transmitting command data commanding the second job mode processing to the second one of the plurality of devices specifically identified by the second designation information in the read out second identification information via the communication interface.

16. The computer-readable medium according to claim 15, wherein each of the first job mode processing and second job mode processing is a process of printing.

17. The computer-readable medium according to claim 16, wherein the first job mode processing is one of a process of photograph printing in which a file structure representing image data is printed, a process of web printing in which a file structure representing a web page is printed, and a process of document printing in which a file structure representing document data is printed, and the second job mode processing is another of the process of photograph printing, the process of web printing, and the process of document printing.

18. The computer-readable medium according to claim 15, wherein the storing step (a) includes storing a first IP address indicating an address of the first one of the plurality of devices specifically identified by the first designation information in the first region as the first address information and the storing step (b) includes storing a second IP address indicating an address of the second one of the plurality of devices specifically identified by the second designation information in the second region as the second address information.

19. The computer-readable medium according to claim 15, wherein said instructions, when executed, being arranged to cause the processor to further perform a step of, if the first identification information is not written into the first region of the memory when the input receiving device receives the first job mode processing, reading out the second identification information from the second region of the memory, and transmitting command data commanding the first job mode processing to the second one of the plurality of devices specifically identified by the second designation information in the read out second identification information via the communication interface.

20. The computer-readable medium according to claim 19, wherein said instructions, when executed, being arranged to cause the processor to further perform a step of, if the first identification information is not written into the first region of the memory when the input receiving device receives the first job mode processing, storing the second designation information and the second address information in the memory as the first identification information.

21. The computer-readable medium according to claim 20, wherein the storing the second designation information and the second address information in the memory as the first identification information includes storing the second identification information in the first region of the memory as the first identification information.

22. The computer-readable medium according to claim 20, wherein said instructions, when executed, being arranged to cause the processor to further perform a step of storing, in the memory, reference history information indicating that the second designation information and the second address information have been stored as the first identification information.

23. The computer-readable medium according to claim 22, wherein said instructions, when executed, being arranged to cause the processor to further perform steps of:
    determining whether the reference history information is stored in the memory or not; and
    if the controller determines that the reference history information is stored in the memory, determining whether the first one of the plurality of devices specifically identified by the first designation information stored in the first region of the memory is the same device as the second one of the plurality of devices specifically identified by the second designation information currently stored in the second region of the memory.

24. The computer-readable medium according to claim 23, wherein said instructions, when executed, being arranged to cause the processor to further perform a step of, when determining that the first one of the plurality of devices specifically identified by the first designation information stored in the first region of the memory and the second one of the plurality of devices specifically identified by the second designation information currently stored in the second region of the memory are not the same, transmitting command data commanding the first job mode processing to the second one of the plurality of devices specifically identified by the second designation information currently stored in the second region of the memory.

25. The computer-readable medium according to claim 23, wherein said instructions, when executed, being arranged to cause the processor to further perform a step of, when determining that the first one of the plurality of devices specifically identified by the first designation information stored in the first region of the memory and the second one of the plurality of devices specifically identified by the second designation information currently stored in the second region of the memory are not the same, updating the first identification information stored in the first region of the memory with the second designation information and the second address information currently stored in the second region of the memory.

26. The computer-readable medium according to claim 15, wherein said instructions, when executed, being arranged to cause the processor to further perform steps of:
    if the first identification information is not written into the first region of the memory when the input receiving device receives the first job mode processing, reading out the second identification information from the second region of the memory;
    determining whether communication with the second one of the plurality of devices specifically identified by the second designation information via the communication interface is possible or not; and
    when the controller determining that communication with the second one of the plurality of devices specifically identified by the second designation information via the communication interface is not possible, failing to transmit command data commanding the first job mode processing to the second one of the plurality of devices specifically identified by the second designation information in the read out second identification information.

27. The computer-readable medium according to claim 26, wherein said instructions, when executed, being arranged to cause the processor to further perform steps of:
    storing, in a third region of the memory, third identification information that specifies a third default device that is associated with a third job mode processing, the third identification information including:
        third designation information that specifically identifies a third one of the plurality of devices, such that the third one of the plurality of devices specifically identified by the third designation information is specified as the third default device; and
        third address information specifying an address of the third one of the plurality of devices specifically identified by the third designation information,
        wherein the third job mode processing is a process of processing a third type of file structure;
    reading out the third identification information from the third region of the memory when the input receiving device receives a third job mode processing, and transmitting command data commanding the third job mode processing to the third one of the plurality of devices specifically identified by the third designation information in the read out third identification information via the communication interface; and
    when determining that communication with the second one of the plurality of devices specifically identified by the second designation information via the communication interface is not possible, reading out the third identification information from the third region of the memory, and transmitting command data commanding the first job mode processing to the third one of the plurality of devices specifically identified by the third designation information in the read out third identification information via the communication interface.

* * * * *